(12) United States Patent
Songhurst

(10) Patent No.: US 8,107,670 B2
(45) Date of Patent: Jan. 31, 2012

(54) SCANNING IMAGES FOR PORNOGRAPHY

(75) Inventor: Mark Songhurst, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 995 days.

(21) Appl. No.: 12/073,907

(22) Filed: Mar. 11, 2008

(65) Prior Publication Data

US 2009/0232413 A1 Sep. 17, 2009

(51) Int. Cl.
*G06K 9/40* (2006.01)

(52) U.S. Cl. ........ 382/100; 382/181; 382/190; 382/218; 382/229; 382/275

(58) Field of Classification Search .................. 382/100, 382/181, 190, 218, 229, 275, 276
See application file for complete search history.

(56) References Cited

U.S. PATENT DOCUMENTS

| | | | |
|---|---|---|---|
| 6,751,348 B2 | 6/2004 | Buzuloiu et al. | |
| 7,103,215 B2 * | 9/2006 | Buzuloiu et al. | 382/165 |
| 7,665,131 B2 * | 2/2010 | Goodman et al. | 726/13 |
| 2003/0009698 A1 * | 1/2003 | Lindeman et al. | 713/201 |
| 2003/0016872 A1 * | 1/2003 | Sun | 382/218 |
| 2009/0232413 A1 * | 9/2009 | Songhurst | 382/275 |

OTHER PUBLICATIONS

Forsyth and Fleck, "Automatic detection of human nudes", International Journal of Computer Vision, 32(1):63-77, Aug. 1999.

Jones and Rehg, "Statistical Color Models with Application to Skin Detection", International Journal of computer Vision, 46(1):81-96, Jan. 2002.

Bosson et al., "Non-retrieval: blocking pornographic images", Proceedings of the International Conference on the Challenge of Image and Video Retrieval, Lecture Notes in Computer Science vol. 2383, Spring, London (2002), pp. 50-60.

Lee et al., "Naked-image detection based on adaptive and extensible skin color model", Pattern Recognition, vol. 40, Issue 8, Aug. 2007, pp. 2261-2270.

Wang et al., "System for screening objectionable images using Daubechies' wavelets and color histograms", in Proc. of the International Workshop on Interactive Disturbed Multimedia Systems and Telecommunication Services, pp. 20-30, 1997.

Tiff Specification, Revision 6.0, Jun. 3, 1992, pp. 1-3, 13-16, 28-31.
JEITA EXIF Specification, Version 2.2, pp. (1)-(3), 1-2, 4, 13-16, 22-23, Apr. 2002.

"IPTC Core" Scheme for XMP, Version 1.0, Specification document, Document Revision 8, 2005.

U.S. Appl. No. 11/984,093, filed Nov. 13, 2007.

* cited by examiner

*Primary Examiner* — Stephen Koziol
(74) *Attorney, Agent, or Firm* — McKay and Hodgson, LLP; Philip McKay

(57) ABSTRACT

A computer system scans image files for pornographic image content by pre-filtering image files to detect the presence in copyright data fields of stored items of copyright information deemed to indicate that the image file is one of acceptable or unacceptable. On detecting such items of copyright information, a signal is output indicating that the image file does or does not contain pornographic image content without the need to analyse the image content of the image file.

18 Claims, 1 Drawing Sheet

SCANNING IMAGES FOR PORNOGRAPHY

BACKGROUND OF THE INVENTION (1) Field of the Invention

The present invention relates to the field of scanning computer image files for pornographic content for the purpose of controlling the distribution of such image files.

(2) Description of Related Art

Computer networks such as the internet are now used to distribute vast amounts of content. Some of the content is objectionable for a variety of reasons and consequently technology has been developed to control what content is distributed. Systems which perform content control may be implemented in a range of manners at a range of locations in a computer network, for example located in a gateway at a node of a network which controls the passage of various types of object or associated with a browser for displaying web pages.

There are many types of objectionable content, but pornographic content in images is of particular significance, there being in practice vast amounts of pornography distributed over computer networks. In order to control distribution, it is necessary first to scan distributed image files to detect the objectionable content. Detection of pornographic content in images poses particular technical difficulties. It is intrinsically difficult for an automated system to distinguish between images which do and do not contain pornographic content.

Typically, the scanning system analyses the image content of the image file to detect the presence of pornographic image content. A variety of algorithms are used, different algorithms having a different balance between on one hand providing good performance and on the other hand minimising latency and processing requirements.

One type of possible technique uses pixels of an image which represent a flesh-tone as a heuristic indicating a likelihood that an image contains pornography. This is simply because pornographic images frequently contain relatively large amounts of flesh-tone. With such a technique, typically there is performed a heuristic analysis which classifies the image as being pornographic or not using measures of predetermined characteristics of the identified pixels to indicate a likelihood that the identified pixels contain pornographic content or not.

However, regardless of the algorithm used, such analysis consumes significant processing resources due to the need to process the image content which consists of a significant amount of data. This is of particular concern in situations where large numbers of images need to be processed, for example in the scanning of emails or the scanning of web pages during internet browsing. It would be desirable to minimise the processing resources required.

One approach to reducing the processing resources required is by careful selection of the algorithm implemented by the scanning system to analyse the image content. However, in very general terms, algorithms which consume lower amounts of processing resources tend to have lower performance in detecting pornographic content, for example providing a good detection rate and a low false positive rate. Thus to achieve any desired performance, significant processing resources are still required.

BRIEF SUMMARY OF THE INVENTION

According to a first aspect of the present invention, there is provided a method of scanning image files for pornographic image content, the method comprising:

maintaining a list of items of copyright information deemed to indicate that the image file is one of acceptable or unacceptable; and processing an image file by:

examining any copyright data fields of the image file containing copyright information to detect the presence of any item of copyright information in said list;

in the event that there is not detected the presence of an item of copyright information in said list, analysing the image content of the image file to detect the presence of pornographic image content, and outputting data indicating that the image file does or does not contain pornographic image content on the basis of the analysis;

in the event that there is detected the presence of an item of copyright information deemed to indicate that the image file is acceptable, outputting data indicating that the image file does not contain pornographic image content, without analysing the image content of the image file; and in the event that there is detected the presence of an item of copyright information deemed to indicate that the image file is unacceptable, outputting data indicating that the image file does contain pornographic image content, without analysing the image content of the image file.

According to a second aspect of the present invention, there is provided a computer system operable to scan image files for pornographic image content, the computer system storing a list of items of copyright information deemed to indicate that the image file is one of acceptable or unacceptable, and comprising:

a pre-filter operable on an image file to examine any copyright data fields of the image file containing copyright information to detect the presence of any item of copyright information in said list; and an image scanner operable on an image file to analyse the image content of the image file to detect the presence of pornographic image content, the computer system being arranged to process an image file by initially operating the pre-filter on the image file, and only in the event that the pre-filter does not detect the presence of an item of copyright information in said list, then operating the image scanner on the image file, the computer system being further arranged to output data indicating that the image file does not contain pornographic image content in the event that the pre-filter detects the presence of an item of copyright information deemed to indicate that the image file is acceptable, to output data indicating that the image file does contain pornographic image content in the event that the pre-filter detects the presence of an item of copyright information deemed to indicate that the image file is unacceptable, and otherwise to output data indicating that the image file does or does not contain pornographic image content on the basis of any analysis performed by the image scanner.

Thus in accordance with the invention, use is made of analysis of the image content of an image file to detect pornographic content. However, it has been appreciated that processing of every image file in this way can be avoided by making use of copyright information stored in copyright data fields of the image file. Many image file formats include such copyright data fields storing information about the copyright owner of the image. It has been appreciated that the information in the copyright data fields can be indicative of the file containing or not containing pornographic content. For example, some copyright owners can be expected to produce images containing pornographic content, whereas other copyright owners can be expected never to produce images containing pornographic content. Another example is that the presence of certain words in the copyright information can be indicative of the image containing pornographic content.

On this basis, for a given image, before analysing the image content of an image file to detect pornographic content, the copyright data field, if present, are compared to a stored list of items of copyright information deemed to indicate that the image file is acceptable or unacceptable. If the copyright data field does contain an item of copyright information in the list, then the image file is considered to contain pornographic content or not on that basis, and in that event the analysis of the image content of the image file is not performed. In this way, it is not necessary to perform such analysis, with its high processing requirement, for every image. Accordingly, the overall processing requirements required to scan a given set of images is reduced. In practice, such use of copyright information may allow a significant reduction in the overall processing requirements.

An embodiment of the present invention will now be described by way of non-limitative example with reference to the accompanying drawings.

DETAILED DESCRIPTION OF THE INVENTION

Figure 1:
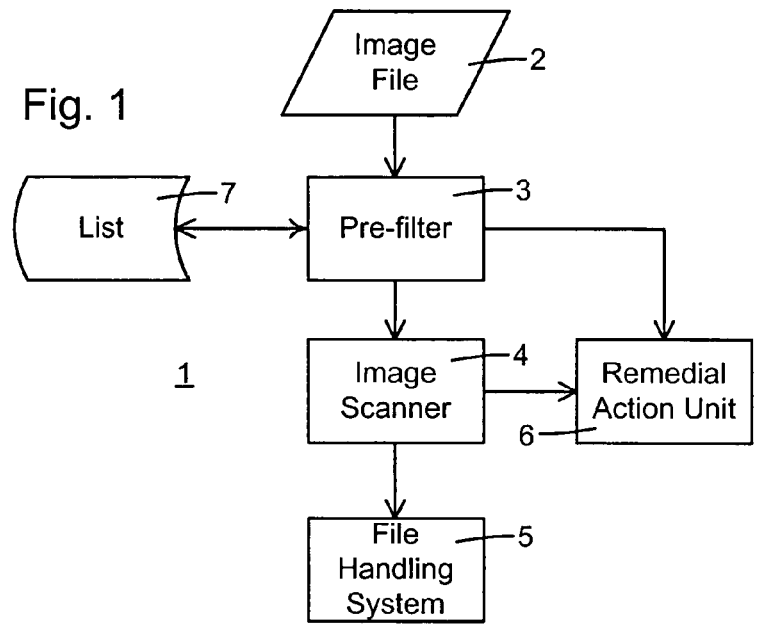
FIG. 1 is a diagram of a scanning system.

A scanning system 1 which is operable to scan image files 2 to detect pornographic content is shown in FIG. 1. The scanning system 1 comprises a pre-filter 3 and an image scanner 4 which operate on individual image files 2 supplied to the scanning system 1 and produce a result indicating the result that the image files 2 do or do not contain pornographic content. The scanning system 1 produces output data representing the results. The data representing the results may be stored in a memory of the scanning system 1 or output from the scanning system 1.

The scanning system 1 is implemented as part of a content control system in which the distribution of the image file 2 is controlled in dependance on the result of the scanning. If the result is that the image file 2 does not contain pornographic content, then a file handling system 5 allows the image file 2 to pass, for example by allowing passage of a message containing the image file 2. If the result is that the image file 2 does contain pornographic content, then remedial action is taken by a remedial action unit 6. The remedial action may be to prevent passage of the image file 2, for example by preventing passage of a message in which it is contained or by deletion of the image file 2 from the message, or may be to notify someone such as a system administrator.

The scanning system 1 may be applied to a range of situations.

One possible implementation of the scanning system 1 is at the node of a network which is typically the internet, but may in principle be any other form of network. In this case, the scanning system 1 processes images which have been extracted from messages which are delivered over the network. The messages may be emails, for example delivered using the SMTP protocol, or any other type of message being delivered across a network, for example HTTP traffic, FTP traffic, IM traffic, SMS traffic or MMS traffic. The image file 2 may be contained in a single message or in a stream of messages.

Another possible implementation is in the context of web browsing. In this case, the scanning system 1 scans image files 2 contained in a webpage being distributed for display by a browser. The scanning system 1 may be implemented in the same computer as the browser or in a different computer, for example a server or gateway through which the webpage is delivered.

The scanning system 1 is implemented in any suitable computer system, as appropriate for the application. The computer system may be a single computer apparatus, such as a server, or may comprise plural computer apparatuses. The various elements of scanning system 1 shown in FIG. 1 may be implemented by software running on a computer apparatus, although optionally some elements could be implemented, at least in part, by dedicated hardware.

The image scanner 4 is operable on an image file 2 supplied thereto to analyse the image content of the image file to detect the presence of pornographic image content. The analysis may implement any suitable technique which processes the image content. Typically, this will be a heuristic technique which uses properties of pixels of an image which represent a flesh-tone as a heuristic indicating a likelihood that an image contains pornography. This is simply because pornographic images frequently contain relatively large amounts of flesh-tone.

One possible technique implemented by the image scanner 4 is that described and illustrated in co-pending U.S. application Ser. No. 11/984,093, the contents of which are incorporated herein by reference. However any other technique which analyses the image content of the image file to detect the presence of pornographic image content may be applied, including without limitation the techniques described in: Forsyth and Fleck, "Automatic detection of human nudes", International Journal of Computer Vision, 32(1):63-77, August 1999; Jones and Rehg, "Statistical Color Models with Application to Skin Detection", International Journal of Computer Vision, 46(1):81-96, January 2002; Bosson et al., "Non-retrieval: blocking pornographic images", Proceedings of the International Conference on the Challenge of Image and Video Retrieval, Lecture Notes in Computer Science vol. 2383, Spring, London (2002), pp. 50-60; Lee et al., "Naked image detection based on adaptive and extensible skin color model", Pattern Recognition, Volume 40, Issue 8, August 2007, pages 2261-2270; Wang et al., "System for screening objectionable images using Daubechies' wavelets and color histograms", in Proc. of the International Workshop on Interactive Distributed Multimedia Systems and Telecommunication Services, pages 20-30, 1997; or U.S. Pat. No. 6,751,348.

The pre-filter 3 is operable on an image file 2 supplied thereto to examine any copyright data fields of the image file 2. Many image file formats allow for the inclusion in an image file 2 of copyright data fields containing copyright information, as part of the metadata stored in the image file 2. Examples of such image file formats include TIFF and JPEG, but the pre-filter 3 may be arranged to process any image file format which supports them, including formats developed in the future. The pre-filter 3 examines the image file 2 to identify any such copyright data fields that may be present and extract their content. This may be achieved by determining the file format, and parsing the file in accordance with the determined file format.

The scanning system 1 stores in a memory thereof a list 7 of items of copyright information deemed to indicate that the image file is one of acceptable or unacceptable. The pre-filter 3 makes use of the stored list 7. In particular, the pre-filter 3 compares any copyright data fields of the image file 2 with the contents of the list 7 to detect the presence of any item of copyright information in said list 7.

The list 7 may include either or both of items deemed to indicate that the image file is acceptable and items deemed to indicate that the image file is unacceptable. In this case acceptable means that the file is deemed not to contain pornographic content and vice versa. It has been appreciated that the information in the copyright data fields can be indicative of the file containing or not containing pornographic content.

For example some copyright owners may be expected to produce images which do not contain pornography. Thus a possible category of items in the list 7 deemed to indicate that the image file 2 is acceptable are the name of such copyright owners. Specific examples in this category are "Corbis", "Alpha Photo Press Agency" and "Getty Images".

Similarly, other copyright owners may be expected to produce images which contain pornography. Thus a possible category of items in the list 7 deemed to indicate that the image file 2 is unacceptable are the name of such copyright owners. Specific examples in this category are "Playboy" and "www.theamateurpussy.com".

It is also observed that certain words are sometimes present in the names of copyright owners that produce images which contain pornography. Such words are typically sexual in nature and often vulgar. Thus another possible category of items in the list 7 deemed to indicate that the image file 2 is unacceptable are such words.

It will be noted that the processing performed by the pre-filter 3, which involves essentially just identification of any copyright data fields and comparison with the list 7, consumes significantly less resource than the processing performed by the image scanner 4, which involves processing of the entire image content of the image file 2.

Figure 2:
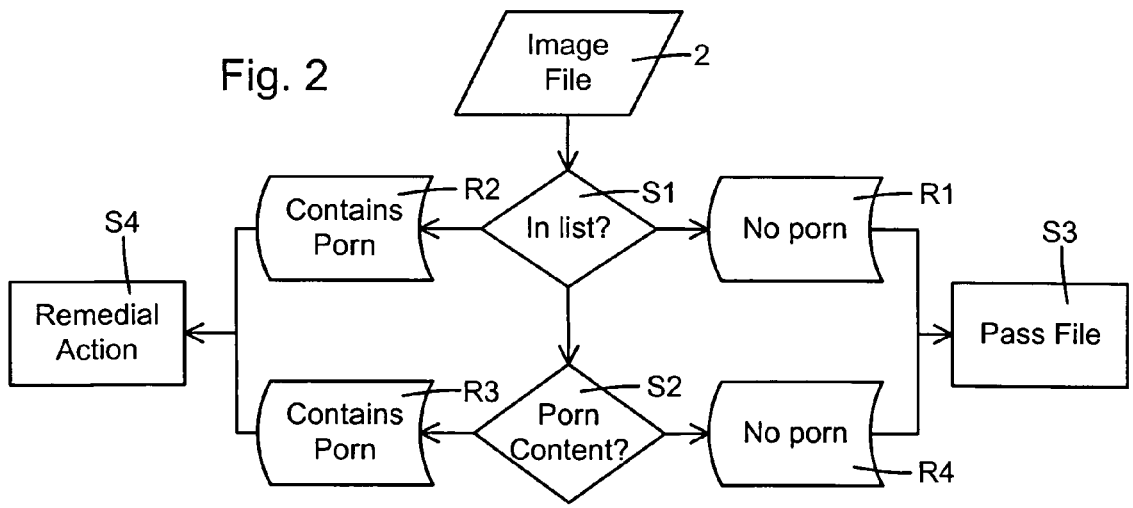
FIG. 2 is a flow chart of the processing performed by the scanning system.

The operation of the scanning system 1 to processes each image file 2 supplied thereto using the pre-filter 3 and the image scanner 4 is shown in FIG. 2 and will now be described.

Initially, in step S1, the image file 2 is supplied to the pre-filter 3 which operates on the image file 2, as described above.

In the event that the pre-filter 3 detects the presence of an item of copyright information in the list 7, the scanning system 1 either (a) produces a result R1 that the file does not contain pornographic content in the event that the detected item is deemed to indicate that an image file is acceptable, or (b) produces a result R2 that the file contains pornographic content in the event that the detected item is deemed to indicate that an image file is unacceptable. The scanning system 1 stores data representing the result R1 or R2. In either case (a) or (b), the image file 2 is not further processed and in particular the image scanner 4 does not operate on the image file 2 so no analysis of the image content of the image file 2 is performed.

However, in the event that the pre-filter 3 does not detect the presence of an item of copyright information in the list 7, then, in step S2, the image file 2 is supplied to the image scanner 4 which operates on the image file 2, as described above. The scanning system 1 produces a result R3 that the file does not contain pornographic content or a result R4 that the file contains pornographic content, on the basis of the analysis of the image content performed by the image scanner 4. The scanning system 1 stores data representing the result R3 or R4.

In the event of results R1 or R3 that the file does not contain pornographic content, in step S3, the image file 2 is supplied to the file handling system 5 which allows the image file 2 to pass, as described above.

In the event of results R2 or R4 that the file contains pornographic content, in step S4, the image file 2 is supplied to the remedial action unit 6 which performs a remedial action, as described above.

Due to the fact that some image files 2 are not processed by the image scanner as a result of having an item of in the list 7, in combination with the fact that the processing performed by the pre-filter 3 consumes significantly less resource than the processing performed by the image scanner 4, the overall processing load is significantly reduced as compared to the case that the image scanner 4 were to process every image file 2.

Of course, this embodiment is not limitative and various modifications may be made.

One possible modification is for the list 7 to only include items deemed to indicate that the file is acceptable. Indeed, in this case the scanning system 1 would still be effective as large numbers of image files 2 encountered in typical situations where content scanning is performed identify copyright owners who may be expected to produce images which do not contain pornography.

Another possible modification is for the list 7 to only include items deemed to indicate that the file is unacceptable. Indeed, this might be useful in situations where it is desired to avoid attempts to circumvent of the scanning system 1 by people purposely generating image files 2 with false copyright information. In this case the scanning system 1 would still be effective as large numbers of image files 2 encountered in typical situations where content scanning is performed contain suitable copyright information allowing them to be identified without analysis of the image content.

The invention claimed is:

1. A method of scanning image files for pornographic image content, the method comprising:
   maintaining a list of items of copyright information deemed to indicate that the image file is one of acceptable or unacceptable; and
   processing an image file by:
   examining any copyright data fields of the image file containing copyright information to detect the presence of any item of copyright information in said list;
   in the event that there is not detected the presence of an item of copyright information in said list, analysing the image content of the image file to detect the presence of pornographic image content, and outputting data indicating that the image file does or does not contain pornographic image content on the basis of the analysis;
   in the event that there is detected the presence of an item of copyright information deemed to indicate that the image file is acceptable, outputting data indicating that the image file does not contain pornographic image content, without analysing the image content of the image file; and
   in the event that there is detected the presence of an item of copyright information deemed to indicate that the image file is unacceptable, outputting data indicating that the image file does contain pornographic image content, without analysing the image content of the image file.

2. A method according to claim 1, wherein the items of copyright information in said list comprise the names of copyright owners deemed to indicate that the image file is acceptable.

3. A method according to claim 1, wherein the items of copyright information in said list comprise the names of copyright owners deemed to indicate that the image file is unacceptable.

4. A method according to claim 1, wherein the items of copyright information in said list comprise words associated with pornography as items deemed to indicate that the image file is unacceptable.

5. A method according to claim 1, wherein all the items of copyright information in said list are deemed to indicate that the image file is acceptable.

6. A method according to claim 1, wherein all the items of copyright information in said list are deemed to indicate that the image file is unacceptable.

7. A method according to claim 1, wherein the step of examining any copyright data fields of the image file is performed in respect of image files in a TIFF format or in a JPEG format.

8. A method according to claim 1, further comprising storing said output data.

9. A computer system operable to scan image files for pornographic image content, the computer system storing a list of items of copyright information deemed to indicate that the image file is one of acceptable or unacceptable, and comprising:
- a pre-filter operable on an image file to examine any copyright data fields of the image file containing copyright information to detect the presence of any item of copyright information in said list; and
- an image scanner operable on an image file to analyse the image content of the image file to detect the presence of pornographic image content,
- the computer system being arranged to process an image file by initially operating the pre-filter on the image file, and only in the event that the pre-filter does not detect the presence of an item of copyright information in said list, then operating the image scanner on the image file,
- the computer system being further arranged to output data indicating that the image file does not contain pornographic image content in the event that the pre-filter detects the presence of an item of copyright information deemed to indicate that the image file is acceptable, to output data indicating that the image file does contain pornographic image content in the event that the pre-filter detects the presence of an item of copyright information deemed to indicate that the image file is unacceptable, and otherwise to output data indicating that the image file does or does not contain pornographic image content on the basis of any analysis performed by the image scanner.

10. A system according to claim 9, wherein the items of copyright information in said list comprise the names of copyright owners deemed to indicate that the image file is acceptable.

11. A system according to claim 9, wherein the items of copyright information in said list comprise the names of copyright owners deemed to indicate that the image file is unacceptable.

12. A system according to claim 9, wherein the items of copyright information in said list comprise words associated with pornography as items deemed to indicate that the image file is unacceptable.

13. A system according to claim 9, wherein all the items of copyright information in said list are deemed to indicate that the image file is acceptable.

14. A system according to claim 9, wherein all the items of copyright information in said list are deemed to indicate that the image file is unacceptable.

15. A system according to claim 9, wherein the step of examining any copyright data fields of the image file is performed in respect of image files in a TIFF format or in a JPEG format.

16. A system according to claim 9, wherein the computer system is further arranged to store said output data.

17. A computer system operable to scan image files for pornographic image content, the computer system storing a list of items of copyright information deemed to indicate that the image file is acceptable, and comprising:
- a pre-filter operable on an image file to examine any copyright data fields of the image file containing copyright information to detect the presence of any item of copyright information in said list; and
- an image scanner operable on an image file to analyse the image content of the image file to detect the presence of pornographic image content,
- the computer system being arranged to process an image file by initially operating the pre-filter on the image file, and only in the event that the pre-filter does not detect the presence of an item of copyright information in said list, then operating the image scanner on the image file,
- the computer system being further arranged to output data indicating that the image file does not contain pornographic image content in the event that the pre-filter detects the presence of an item of copyright information deemed to indicate that the image file is acceptable, and otherwise to output data indicating that the image file does or does not contain pornographic image content on the basis of any analysis performed by the image scanner.

18. A computer system operable to scan image files for pornographic image content, the computer system storing a list of items of copyright information deemed to indicate that the image file is unacceptable, and comprising:
- a pre-filter operable on an image file to examine any copyright data fields of the image file containing copyright information to detect the presence of any item of copyright information in said list; and
- an image scanner operable on an image file to analyse the image content of the image file to detect the presence of pornographic image content,
- the computer system being arranged to process an image file by initially operating the pre-filter on the image file, and only in the event that the pre-filter does not detect the presence of an item of copyright information in said list, then operating the image scanner on the image file,
- the computer system being further arranged to output data indicating that the image file does contain pornographic image content in the event that the pre-filter detects the presence of an item of copyright information deemed to indicate that the image file is unacceptable, and otherwise to output data indicating that the image file does or does not contain pornographic image content on the basis of any analysis performed by the image scanner.

* * * * *